United States Patent Office 2,929,634
Patented Mar. 22, 1960

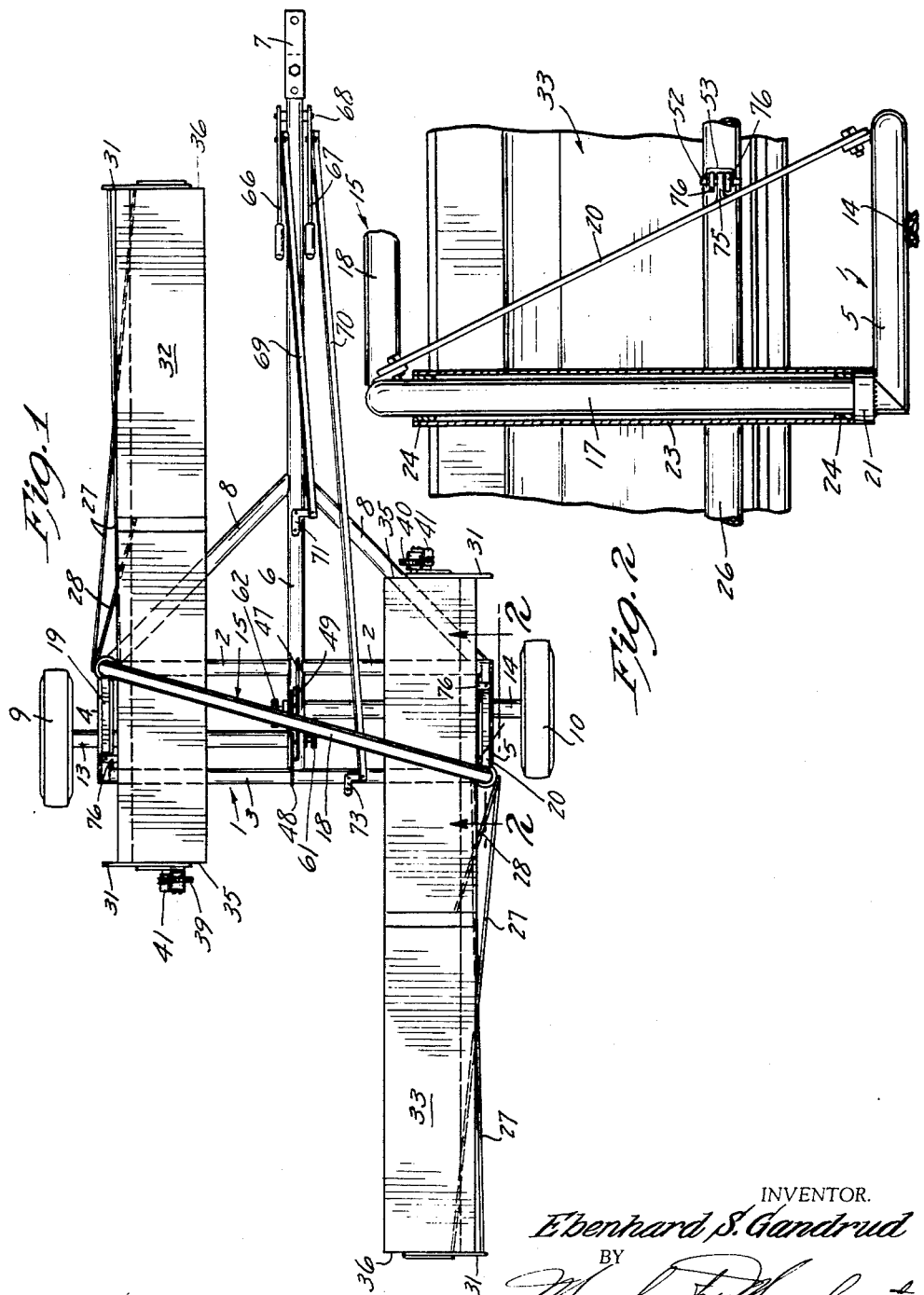

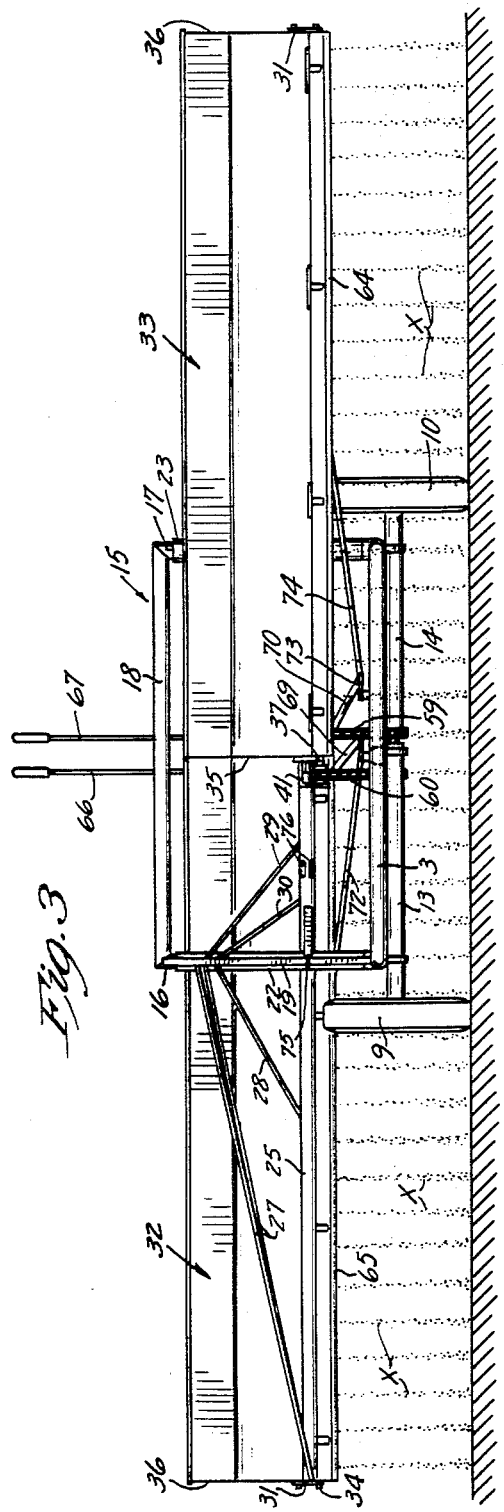

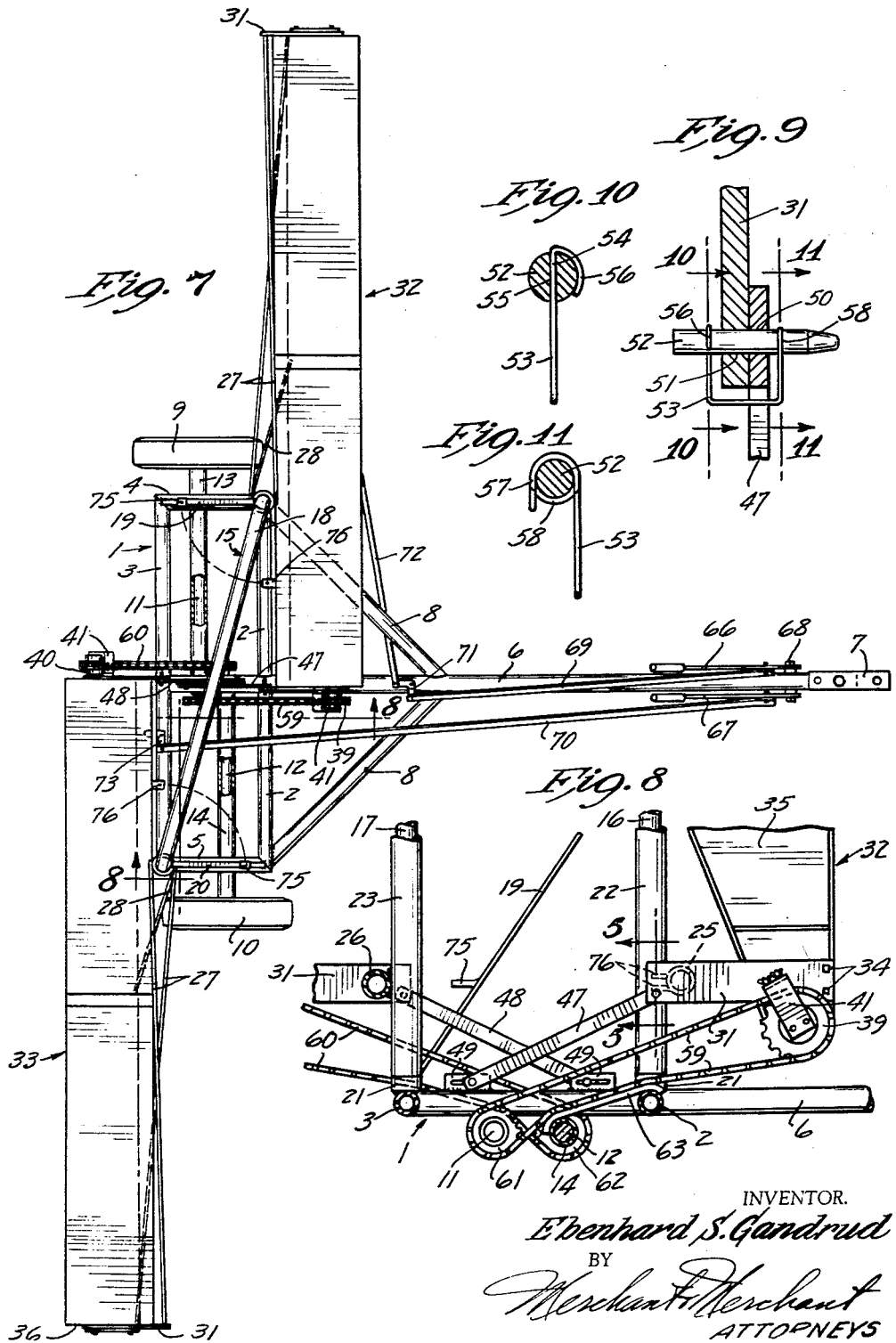

2,929,634

SPREADER WITH FOLDING FRAME

Ebenhard S. Gandrud, Owatonna, Minn.

Application June 28, 1957, Serial No. 668,743

7 Claims. (Cl. 275—2)

My invention relates generally to agricultural implements, and more particularly to such implements used in the broadcast spreading of seeds, granular or powdered fertilizer, and the like.

More specifically, my invention relates to improvements in spreading machines of the type shown in my United States Letters Patent No. 2,350,107.

An important object of my invention is the provision of a spreading machine having a pair of material receiving and spreading hoppers mounted on a mobile frame for movements between operative positions, wherein said hoppers are disposed in generally end to end relation transversely of the direction of travel of the machine to spread the material over a relatively wide area during movement of the machine over a field, and inoperative positions wherein said hoppers are disposed in relatively close laterally spaced relation generally parallel to the direction of travel, whereby the overall width of the machine is reduced to a minimum for highway trave, passage through gateways, etc.

Another object of my invention is the provision of a spreading machine having a pair of elongated material spreading hoppers mounted on a wheel supported frame for movements between operative positions, wherein said hoppers extend transversely of the direction of travel and the outer ends thereof are disposed in laterally outwardly spaced relation to the wheels of the machine, and inoperative positions, wherein the hoppers extend generally longitudinally of the direction of movement of the machine, said outer ends being disposed one forwardly and one rearwardly of the frame, whereby to maintain a predetermined trim or balance relationship on the frame when both of said hoppers are in their operative or inoperative positions.

A still further object of my invention is the provision of a relatively simple and extremely rigid frame for supporting the material distributing hoppers in all positions of movement of said hoppers, and of novel means for releasably locking said hoppers in both their operative positions and inoperative positions.

The above, and still further highly important objects and advantages of my invention, will become apparent from the following detailed specification, appended claims and attached drawings.

Referring to the drawings, which illustrate the invention, and in which like reference characters indicate like parts throughout the several views:

Fig. 1 is a view in top plan of my novel spreading machine, the hoppers thereof being disposed in their inoperative positions;

Fig. 2 is an enlarged fragmentary view partly in side elevation and partly in plan, taken substantially on the line 2—2 of Fig. 1.

Fig. 3 is a view in rear elevation, showing the spreading hoppers in their operative positions;

Fig. 4 is a view in side elevation as seen from the right to the left with respect to Fig. 3;

Fig. 5 is an enlarged fragmentary view corresponding to a portion of Fig. 4;

Fig. 6 is an enlarged view in perspective of an end portion of one of the hoppers as seen in Fig. 4;

Fig. 7 is a view corresponding to Fig. 1 but showing the hoppers moved to their operative material spreading positions;

Fig. 8 is an enlarged fragmentary view partly in section and partly in side elevation taken substantially on the irregular line 8—8 of Fig. 7;

Fig. 9 is a greatly enlarged fragmentary section taken on the line 5—5 of Fig. 8;

Fig. 10 is a still further enlarged fragmentary detail detail taken substantially on the line 10—10 of Fig. 9; and Fig. 11 is an enlarged section taken substantially on the line 11—11 of Fig. 9.

In the preferred embodiment of my invention illustrated, the numeral 1 indicates in its entirety a horizontal generally rectangular frame comprising, a pair of aligned front frame members 2, a rear frame member 3 in rearwardly spaced parallel relationship to the front frame members 2, side frame members 4 and 5 and an elongated tongue 6. Preferably, the frame members and tongue are made from rigid tubular steel or the like, the opposite ends of the side frame members 4 and 5 being welded or otherwise rigidly secured to the adjacent outer ends of the front frame members 2 and the ends of the rear frame member 3. The rear end of the tongue 6 is welded to the longitudinally central portion of the rear frame member 3 and extends forwardly between the inner ends of the front frame members 2, said inner ends of the front frame members 2 being rigidly anchored to the tongue 6 by welding or the like. A pair of hitch bars or plates 7 are anchored to the front end of the tongue 6, and are adapted to be releasably secured to the draw bar of pulling means such as a tractor, not shown. For the purpose of adding rigidity, I provide a pair of angular brace members 8 welded or otherwise rigidly secured at their rear ends to the outer ends of the front frame members 2 and at their front ends to the tongue 6 forwardly of the front frame members 2. Preferably, the front, rear, and side frame members as well as the tongue 6 and brace members 8, are disposed in a common generally horizontal plane.

A pair of pneumatic tire equipped supporting wheels 9 and 10 are disposed laterally outwardly of the side frame members 4 and 5 respectively and are rigidly secured to the outer ends of respective drive shafts 11 and 12 that are journalled for rotation in tubular bearings 13 and 14 respectively. The tubular bearings 13 and 14 are welded at their inner and outer end portions respectively to under surface portions of the tongue 6 and their respective side frame members 4 and 5, in spaced parallel relationship between the front and rear frame members 2 and 3 respectively, the tubular bearing 14 being offset from the bearing 11 in a direction forwardly of the machine for a purpose which will hereinafter become apparent.

The frame 1 further includes an inverted generally U-shaped member 15 which is disposed generally diagonally of the frame and which comprises a pair of vertically disposed legs 16 and 17 and a cross bar 18. Like the other members comprising the frame 1, the legs and cross bar are preferably made from tubular steel or the like, the upper ends of the legs being welded or otherwise rigidly secured to opposite ends of the cross bar 18, the lower end of the leg 16 being welded or otherwise rigidly secured to the front end of the side frame member 4 and the adjacent end of the front frame member 2 connected therewith, the lower end of the leg 17 being welded or otherwise rigidly anchored to the rear end of the side frame member 5 and the adjacent end of the rear frame member 3. The U-shaped member 15 is further held rigid with the frame 1 by a pair of inclined brace members 19 and 20 that are rigidly anchored at their upper ends to the upper end portions of the legs 16 and 17 respectively, the lower end of the brace member 19 being rigidly secured to the rear end portion of the side frame member 4, and the brace 20 being rigidly secured at its lower end to the front end portion of the side frame member 5.

The lower end portions of the legs 16 and 17 are formed to provide annular shoulder defining collars 21 each supporting a different one of a pair of tubular mounting the tubular members 22 and 23 respectively between the on respective ones of the legs 16 and 17, and journalled thereon by means of sleeve bearings or the like 24. A pair of horizontally disposed elongated rigid supporting arms 25 and 26 preferably made from tubular steel or the like, are welded or otherwise rigidly anchored to the tubular member 22 and 23 respectively between the longitudinally center and the lower end of each of said of the hoppers 32 and 33, the brackets 31 are provided connections between the supporting arms 25 and 26 with their respective tubular members 22 and 23 lie between one end and the longitudinal center of each of the supporting arms 25 and 26. With reference to Fig. 3 it will be seen that the longer projected portions of the supporting arms 25 and 26, one of which is there shown, are braced by tie rods or the like 27 and 28 connected at their lower ends to longitudinally spaced portions of the supporting arms and at their upper ends to respective ones of the tubular members 22 and 23. The shorter projecting portions of the supporting arms 25 are braced by other tie rods 29 and 30 also welded or otherwise rigidly secured at their lower ends to the supporting arm 25 at longitudinally spaced points and at their upper ends to their respective tubular members 22 and 23.

Welded or otherwise rigidly secured to opposite ends of each of the supporting arms 25 and 26 are opposed horizontally extending transverse plate-like brackets 31 which support elongated material dispensing hoppers 32 and 33 each substantially coextensive in length with a respective one of the supporting arms 25 and 26. Preferably, the hoppers 32 and 33 are secured in place between their respective supporting brackets 31 by means of bolts or the like 34 extending through suitable openings in the brackets 31 and screw threaded into the inner and outer end walls 35 and 36 respectively of each of said hoppers 32 and 33. The material spreading hoppers 32 and 33 are of the type shown and described in my prior U.S. patent above identified, and as there shown, contain rotary agitators which overlie the perforate bottoms of the hoppers, said bottoms having underlying longitudinally extended valve acting slide elements. In view of the disclosure in said patent and of the fact that the details of the hopper construction do not in themselves comprise the instant invention, such detailed showing and description herein is deemed unnecessary. Hence, for the sake of brevity such detailed showing and description is omitted. It will be noted with reference to Figs. 3 and 5, that one of the agitator shafts, journalled in the inner end walls 35 of the hopper 33 is shown at 37 and that the opposite end of an agitator shaft journalled in the outer end wall 36 of the hopper 32 is indicated at 38 in Fig. 5. The agitator shafts of both hoppers 32 and 33 are provided with rotary members in the nature of sprocket wheels 39 and 40 respectively that are slidably mounted thereon for common rotation therewith. The sprocket wheels 39 and 40 are held against axially outward movement by bracket elements 41 that are adjustably secured to mounting lugs 42 projecting outwardly from adjacent ones of the brackets 31, the bracket elements 41 each having adjustably mounted thereon end bearings 43 which engage the outer end of the sprocket wheels 39. At the outer ends of the hoppers 32 and 33, the brackets 31 are provided with stop plates 44 that are pivotally secured to their respective brackets 31 for swinging movements toward and away from engagement with the adjacent ends 38 of the agitator shafts not shown. Lock screws 45 screw threaded into the outer end walls 36 of the hoppers 32 and 33 are received in notches 46 in the stop plates 44 to releasably lock the stop plates 44 in their operative positions over the end 38, as indicated by dotted lines in Fig. 5.

The spreading hoppers 32 and 33 with their respective supporting arms 25 and 26, are pivotally movable about the vertical axes of their respective legs 16 and 17 of the U-shaped member 15, between inoperative transport positions, as shown in Fig. 1, and laterally extended operative positions, as shown in Figs. 3, 4 and 7. With further reference to Fig. 7 it will be noted that, when the hoppers 32 and 33 are in their operative positions, the generally vertical axis of pivotal movement of the hopper 32 is rearwardly of the hopper 32 while the axis of pivotal movement of the hopper 33 is disposed forwardly of the hopper 33. Moreover, the inner end of the hopper 32 is disposed in overlapping relationship to the adjacent end of the hopper 33 in a direction transversely of the direction of movement of the machine. Means for releasably locking the hoppers 32 and 33 in their operative positions of Figs. 3, 4 and 7 in parallel relationship to the axes of their respective wheels 9 and 10, comprises a pair of rigid links 47 and 48 that are each adjustably pivotally secured at one end to a different one of a pair of slotted brackets 49 that are anchored to the rear end portion of the tongue 6 intermediate the front and rear frame members 2 and 3 respectively. The opposite or outer ends of the links 47 and 48 are each provided with transverse apertures 50 that are alignable with corresponding apertures 51 in the adjacent inner brackets 31 for reception therein of lock pins 52, see Fig. 9. For the purpose of releasably holding the lock pins 52 in the apertures 50 and 51 against accidental removal therefrom, I provide resilient generally U-shaped clip elements 53 each having one end portion 54 extending through a transverse aperture 55 in its respective pin 52 and partially encompassing the engaged portion of the pin 52, as indicated at 56, see Fig. 10. The opposite end of each clip element 53 is formed to provide a hook element 57 that is received in a radially outwardly opening circumferential groove 58 near the opposite end of each lock pin 52, see Fig. 11. With reference to Fig. 9 it will be seen that opposite end portions of the clip element 53 are disposed on opposite sides of their respective brackets 31 and rigid links 47—48, whereby to limit axial movement of the lock pins in opposite directions. The drive shafts 11 and 12 are operatively coupled to their respective toothed rotary members or sprocket wheels 39 and 40 by endless link chains 59 and 60 which are entrained on respective drive sprockets 61 and 62 fast on the inner ends of the drive shafts 11 and 12 respectively, see Figs. 7 and 8. Guide bars 63, one of which is shown in Fig. 8, engage the chains 59 and 60 to prevent rubbing of the chains against the tubular bearings 13 and 14 and the front and rear frame members 2 and 3 respectively during operation of the machine in a field. With the above described driving arrangement, it will be seen that the rotary mechanism of the hopper 32 is driven from the adjacent wheel 9, while the rotary mechanism of the hopper 33 is driven from its adjacent wheel 10. Thus, when the machine is traveling around a corner or curve, the rotary mechanism of the hopper most remote from the center of the curve is driven at a faster rate than that of the nearer hopper, thus insuring substantially uniform spreading of material on the ground.

When the spreading hoppers 32 and 33 are in their operative positions of Figs. 3, 4 and 7, the above mentioned valve acting gate plates of the hoppers 32 and 33, indicated at 64 and 65 respectively, are controlled by control levers 66 and 67 respectively pivotally secured to the front end portion of the tongue 6, as indicated at 68. Rigid control rods 69 and 70 are pivotally connected at their front ends to the levers 66 and 67 respectively, the rear end of the control rod 69 being pivotally secured to one arm of a bell crank 71 that is pivotally mounted on the tongue 6, see Figs. 1 and 7. A rigid link 72, may be assumed to be operatively connected at its outer end to the intermediate portion of the gate plate 65, and is releasably pivotally connected at its inner end to the other arm of the bell crank 71, whereby swinging movements of the control lever 66 will impart longitudinal sliding movements to the gate plate 64 to control flow of the material from the hopper 32, said material being indicated at X in Fig. 3. The rear end of the control rod 70 is pivotally connected to one arm of a bell crank 73 that is pivotally mounted on the rear frame member 3, see Figs. 1 and 7. The other arm of the bell crank 73 is releasably pivotally secured to a rigid link 74, the outer end of which may be assumed to be operatively connected to the gate plate 64 of the hopper 33, whereby the control lever 67 may be manipulated to control flow of material X from the hopper 33. The overlapping relationship of the inner ends of the hopper 32 and 33 assures uniform distribution of the material X over the entire area covered by the hoppers 32 and 33, particularly at the center of the machine.

When the links 47 and 48 are uncoupled from their respective brackets 31, by removal of the lock pins 52, and the gate plate operating links 72 and 74 have been disconnected from their respective bell cranks 71 and 73, the hoppers 32 and 33 may be swung about the axes of their respective links 16 and 17 in clockwise direction with respect to Figs. 1 and 7 to their inoperative transport positions of Fig. 1. When the hoppers 32 and 33 are thus positioned, it will be noted that the outer end 36 of the hopper 32 is disposed forwardly of the frame 1, while the outer end 36 of the hopper 33 is disposed rearwardly of the frame 1. The arrangement is such that the balance or trim longitudinally of the tongue 6 remains substantially the same whether the hoppers 32 and 33 are in their operative positions or in their inoperative positions. In other words, the relatively light downward pressure exerted at the hitch end of the tongue 6 by the weight of said tongue and the brace members 8 forwardly of the wheels 9 and 10 is not substantially changed when the hoppers 32 and 33 are moved from their operative positions of Fig. 7 to their inoperative positions of Fig. 1, it being well known that trailing characteristics of a two-wheeled vehicle are at the optimum when the center of balance thereof lies forwardly of the axis or axes of the wheels. It will be further noted that, when the hoppers 32 and 33 are in their inoperative transport positions of Fig. 1, both hoppers are disposed between the planes of the outside of the ground-engaging wheels 9 and 10. Thus, in this position of the hoppers, the dimension between said planes of the wheels becomes the widest dimension of the entire device, this dimension being preferably within the maximum permitted for highway travel whereby, when the machine is brought to a field to be treated and the hoppers 32 and 33 moved to their operative positions of Fig. 1, maximum lateral stability of the machine is achieved.

For the purpose of releasably locking the hoppers 32 and 33 in their inoperative positions of Fig. 1, I provide horizontally disposed locking lugs 75 on the inclined braces 19 and 20, and pairs of cooperating vertically spaced lugs 76 welded or otherwise rigidly secured to the tubular hopper supporting arms 25 and 26, that receive the lugs 75 therebetween. The lugs 75 are provided with suitable apertures that are aligned with cooperating apertures in the lugs 76 when the hoppers are moved to their position of Fig. 1, for reception of the lock pins 52 that are releasably locked in position by their respective clip elements 53 in the manner described in connection with the links 47 and 48 and their respective brackets 31. Although I have shown the chains 59 and 60 as being removed from the machine in its position of Fig. 1, in actual practice it is only necessary to uncouple the chains from their respective sprocket wheels 61 and 62 and thereafter loop the chains over their respective brackets 41 and lugs 42 to prevent the same from sagging on the ground during travel of the machine on a highway.

The forward and rearward offset relationship of the drive shafts 11 and 12 permit a minimum forward and rearward offset relationship to be maintained between the hoppers 32 and 33 when the same are in their operative positions, while the hoppers are supported at a suitable relatively low level above the ground.

My invention has been thoroughly tested and found to be completely satisfactory for the accomplishment of the objectives set forth; and while I have shown a commercial embodiment of my device, it will be understood that the same is capable of modification, and that modification may be made without departure from the spirit and scope of the invention as defined in the claims.

What I claim is:

1. In a machine for spreading powdered or granular material, a generally horizontally disposed rigid frame including an inverted generally U-shaped member defining a pair of laterally spaced upright legs one of which is disposed in forwardly spaced relation to the other thereof, a pair of ground engaging wheels, means journalling said wheels at opposite sides of said frame, a pair of generally horizontally disposed elongated material spreading hoppers, and means pivotally mounting said hoppers between one end and the longitudinal center thereof each to a different one of said legs for swinging movements between operative positions generally parallel to the axes of said wheels and inoperative transport positions generally parallel to the direction of movement of the machine and between the planes of the outer sides of said wheels, the inner end of one of said hoppers being disposed in forwardly spaced overlapping relationship with the adjacent inner end of the other of said hoppers transversely of the direction of movement of the machine and the outer ends of said hoppers being disposed laterally outwardly beyond said planes of their respective wheels when said hoppers are moved to their operative positions.

2. In a machine for spreading powdered or granular material, a generally horizontally disposed rigid frame including an inverted generally U-shaped member defining a pair of spaced upright legs one of which is disposed in forwardly spaced relation to the other thereof, ground engaging wheels journalled at opposite sides of said frame, a pair of generally horizontally disposed elongated material spreading hoppers, and means pivotally mounting said hoppers between one end and the longitudinal center thereof each to a different one of said legs for swinging movements between operative positions generally parallel to the axes of said wheels and inoperative transport positions generally parallel to the direction of movement of the machine and between the planes of the outer sides of said wheels, the inner end of one of said hoppers being disposed in forwardly spaced overlapping relationship with the adjacent inner end of the other of said hopper transversely of the direction of movement of the machine and the outer end of said hoppers being disposed laterally outwardly beyond said planes of the wheels when said hoppers are moved to their operative positions, said outer ends of the hoppers being disposed one forwardly and one rearwardly of said frame when said hoppers are moved to their inoperative transport positions.

3. In a machine for spreading powdered or granular material, a generally rectangular horizontal frame, an inverted generally U-shaped member extending diagonally across said frame and defining a pair of rigid legs extending upwardly from diagonally opposite corners of said frame, a pair of ground-engaging wheels, means journalling said wheels at opposite sides of said frame, a pair of tubular mounting members, each of said legs extending axially through a different one of said tubular mounting members and journalling the same for rotation thereon, a pair of generally horizontally disposed elongated material spreading hoppers, and means rigidly mounting said hopper each to a different one of said tubular mounting members for common rotation therewith on the axis of its respective leg, whereby said hoppers are movable between operative positions generally parallel to the axes of said wheels and in operative transport positions generally at right angles to the operative position of the machine, the inner end of one of said hoppers being disposed in forwardly spaced overlapping relationship with the adjacent inner end of the other of said hopper transversely of the direction of movement of the machine when said hopeprs are moved to their operative positions.

4. The structure defined in claim 3 in which the hopper mounting means includes a pair of elongated generally horizontal arms each rigidly anchored to a different one of said tubular mounting members and each extending in parallel relation to a different one of said hoppers, and bracket elements extending transversely from opposite ends of said arms and releasably anchored to adjacent ends of said hoppers.

5. In a machine for spreading powdered or granular material, a generally horizontally disposed rigid frame including an inverted generally U-shaped member defining a pair of laterally spaced upright legs one of which is disposed in forwardly spaced relation to the other thereof, a pair of drive shafts, ground engaging wheels secured to the outer ends of said drive shafts, means journalling said drive shafts to said frame on parallel horizontal axes spaced apart in the direction of travel of the machine, a pair of generally horizontally disposed elongated material spreading hoppers, rotary members mounted on said hopper for rotation on horizontal axes parallel to the longitudinal dimensions of their respective hoppers, releasable means operatively coupled to the inner ends of said drive shafts and to respective ones of said rotary members for imparting rotation thereto responsive to rotation of said drive wheels, and means pivotally mounting said hopeprs between one end and the longitudinal center thereof each to a different one of said legs for swinging movements between operative positions generally parallel to the axes of said drive shafts and inoperative positions generally parallel to the direction of movement of the machine and between the planes of the outer sides of said wheels, the inner end of one of said hoppers being disposed in forwardly spaced overlapping relationship with the adjacent inner end of the other of said hopper transversely of the direction of movement of the machine and the outer ends of said hoppers being disposed laterally outwardly beyond the planes of said wheels when said hoppers are moved to their operative positions.

6. The structure defined in claim 5 in further combination with means for releasably locking said hoppers in their operative positions, said last-mentioned means comprising rigid links adjustably secured to said frame, brackets on said hoppers, said links and their respective brackets having apertures in axial alignment when said hoppers are moved to their operative positions, lock pins received in said aligned apertures, and clip elements on said lock pins for holding said pins against removal thereof from said apertures.

7. In a machine for spreading powdered or granular material, a rigid frame including a pair of laterally spaced generally upright frame members one of which is disposed in forwardly spaced relation to the other thereof, a pair of drive shafts, ground engaging wheels secured to the outer ends of said drive shafts, means journalling said drive shafts to said frame on horizontal axes extending transversely of the direction of travel of the machine, a pair of generally horizontally disposed elongated material spreading hoppers, sprocket wheels mounted on the inner ends of said hoppers for rotation on horizontal axes extending longitudinally through their respective hoppers, cooperating sprocket wheels on the adjacent inner ends of said drive shafts, a pair of endless drive chains each running over a different one of said drive shaft mounted sprocket wheels and a cooperating one of the sprocket wheels on said hoppers, whereby each of the hopper mounted sprocket wheels is driven by the wheel at the same side of said frame as its respective hopper, and means journalling each of said hoppers to a different one of said generally upright frame members for swinging movements between operative positions generally parallel to the axes of said drive shafts with the inner ends of said hoppers in forwardly and rearwardly spaced transverse overlapping relationship and inoperative transport positions generally parallel to the directions of movement of the machine and between the planes of the outer sides of said wheels, said inner end of one of said hoppers being disposed in forwardly spaced relation to said frame and said inner end of the other of said hoppers being disposed rearwardly of said frame when said hoppers are moved to their inoperative transport positions.

References Cited in the file of this patent

FOREIGN PATENTS

| | | |
|---|---|---|
| 152,929 | Germany | July 4, 1904 |
| 4,682 | Great Britain | Mar. 6, 1894 |
| 762,645 | Great Britain | Nov. 28, 1956 |
| 143,089 | Sweden | Nov. 24, 1953 |